United States Patent [19]

Christ

[11] Patent Number: 5,303,070
[45] Date of Patent: Apr. 12, 1994

[54] METHOD AND APPARATUS FOR SELECTION OF DATA PACKETS IN DOUBLE SIDED SCANNING

[75] Inventor: John R. Christ, Santa Clara, Calif.
[73] Assignee: Konica Corporation, Japan
[21] Appl. No.: 820,332
[22] Filed: Jan. 13, 1992
[51] Int. Cl.$^5$ .............................................. H04N 1/04
[52] U.S. Cl. ..................................... 358/474; 358/453
[58] Field of Search ............... 358/471, 474, 486, 494, 358/452, 453, 496; 355/23, 24, 319; H04N 1/04

[56] References Cited

U.S. PATENT DOCUMENTS

| | | | |
|---|---|---|---|
| 4,825,250 | 4/1989 | Miyata et al. | 355/319 |
| 4,908,719 | 3/1990 | Nonoyama | 358/494 |
| 4,949,189 | 8/1990 | Ohmori | 358/474 |
| 5,119,206 | 6/1992 | Rourke et al. | 358/452 |

Primary Examiner—Edward L. Coles, Sr.
Assistant Examiner—Kim Yen Vu
Attorney, Agent, or Firm—Jordan B. Bierman

[57] ABSTRACT

An image processing apparatus adapted to scan both sides of a document simultaneously in independent, arbitrary areas as directed by a host computer. When both sides of the document are read, the CPU and firmware ROM select the order of the output image data to maximize the image data throughput to the host computer. The image data is sent to the host computer in packets which are limited in size based upon corresponding limitations in the host. A typical such limitation is a maximum of 65,535 bytes including the header which identifies various parameters relating to the scanning process.

10 Claims, 9 Drawing Sheets

METHOD AND APPARATUS FOR SELECTION OF DATA PACKETS IN DOUBLE SIDED SCANNING

The present invention is directed to an apparatus and method for simultaneous double sided scanning of documents; more specifically, to such a device wherein the data is transferred from the scanner to the host computer at a rapid and efficient rate.

BACKGROUND OF THE INVENTION

Simultaneous double sided scanning of documents has been known for some time. The amount of data which can be transferred from the scanner to the host computer at any given time is limited, usually to 65,535 bytes. This would include a 20 byte header which identifies document size, resolution, bytes per image line, total bytes of image data in the packet, image compression, and the like.

Previously, devices of this kind waited until the entire scan was complete before deciding which side's scan would be transmitted first. Alternatively, first one entire side and then the second side were sent. From a performance standpoint, this resulted in a loss of efficiency, since the data was not being sent at or near the maximum permitted rate at all times.

BRIEF DESCRIPTION OF THE INVENTION

It is among the objects of the present invention to provide an apparatus and method which operates within the required transfer limitations and, at the same time, provides improved efficiency of transmission.

The present invention comprises a scanner, connected to a host computer, which is capable of scanning both sides of the original document at the same time. There is an image RAM adapted to receive the image data from the scanner and which is of sufficient size to be able to retain the image data from both sides of the original.

An image RAM controller is connected to a CPU, the image RAM, and the host computer and is capable of keeping a running total of the image data. During the scanning, the CPU reads the running total from the controller and reads the transfer size limitations from the host computer. These limitations are transmitted to the scanner for its use. The host computer determines the total area on each side to be scanned and transmits this information to the scanner.

The scanner determines the size of a packet window on each side of the document which meets the limitations imposed by the host computer. It then determines the location of the bottom of a first packet window on one side and the bottom of a second packet window on the other side. At the same time, the scanner determines which of the two bottoms is closer to the scanner head as the paper moves in the scanning direction.

The scanner then transfers data to the host computer from the packet window having its bottom nearer the current position of the scanner head in the aforementioned scanning direction. In the event that both bottoms are equidistant from the position of the scanner head, side A (the first side) of the document is selected for transmittal.

In a preferred form of the device, limitation data relating to document size, resolution, compression, bytes per image line, and an indication of the last packet in the document are transferred from the host computer to the scanner prior to the beginning of the scan.

The nature of the current hardware in connection with which the present invention is used is such that the various dimensions be evenly devisable by 1 mm. Therefore, the packet windows are selected so that, if there is a fractional millimeter in a dimension, it is reduced to the next lower non fractional millimeter.

Thus, by selecting the packet window, the scanning of which will be completed first, maximum efficiency in the transfer is obtained. If the two windows have the same bottom (i.e. scanning thereof will be completed at the same time), side A of the document is selected for transfer.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
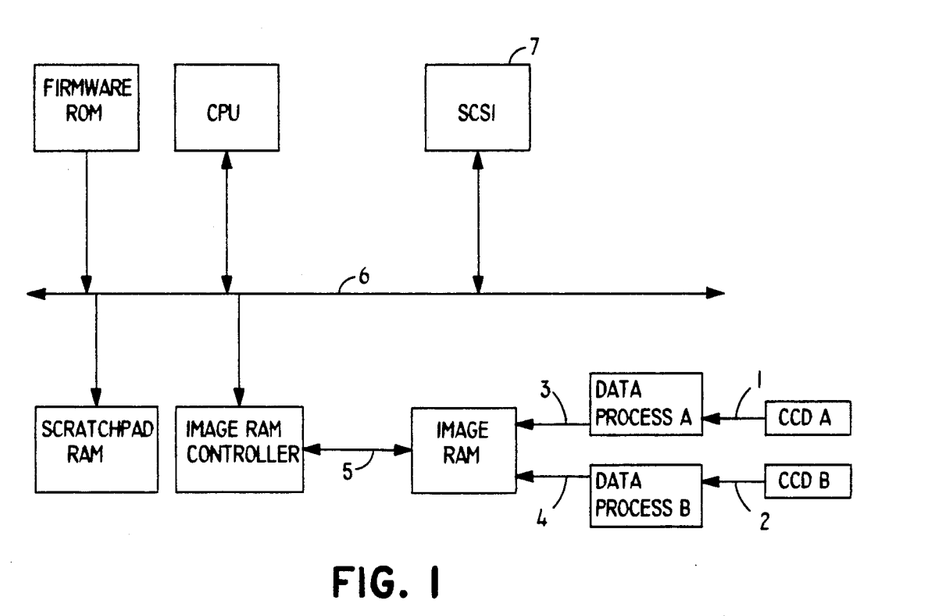
FIG. 1 is a block diagram showing the apparatus of the present invention.

Referring first to FIG. 1, the firmware ROM contains the firmware which instructs the CPU to interpret the commands received by the scanner through the Small Computer System Interface (SCSI) from the host computer (not shown). The host computer is connected to the scanner through the interface at arrow 7. When the commands are received by the scanner, they are stored in the Scratch Pad RAM where they are decoded, parsed, and executed.

When the host computer commands the scanner to scan a double sided document, CCD A and CCD B are used to input the analogue video data from side A and side B, respectively. This analogue video data is converted into digital data after it is transferred to Data Process A and Data Process B through video buses 1 and 2, respectively.

After conversion of each to digital data, both sets are input into the image RAM through image data buses 3 and 4, respectively. The image RAM controller is connected to the image RAM by control and address bus 5. The image RAM controller, the scratch pad RAM, the CPU, the firmware ROM, and the SCSI interface chip are all connected to CPU address and data bus 6. As the image is input into the image RAM, the image RAM controller maintains a running total of the amount of image data that has been received by the image RAM from the original document. The CPU can read this running total while the scan is in progress.

Figure 2:
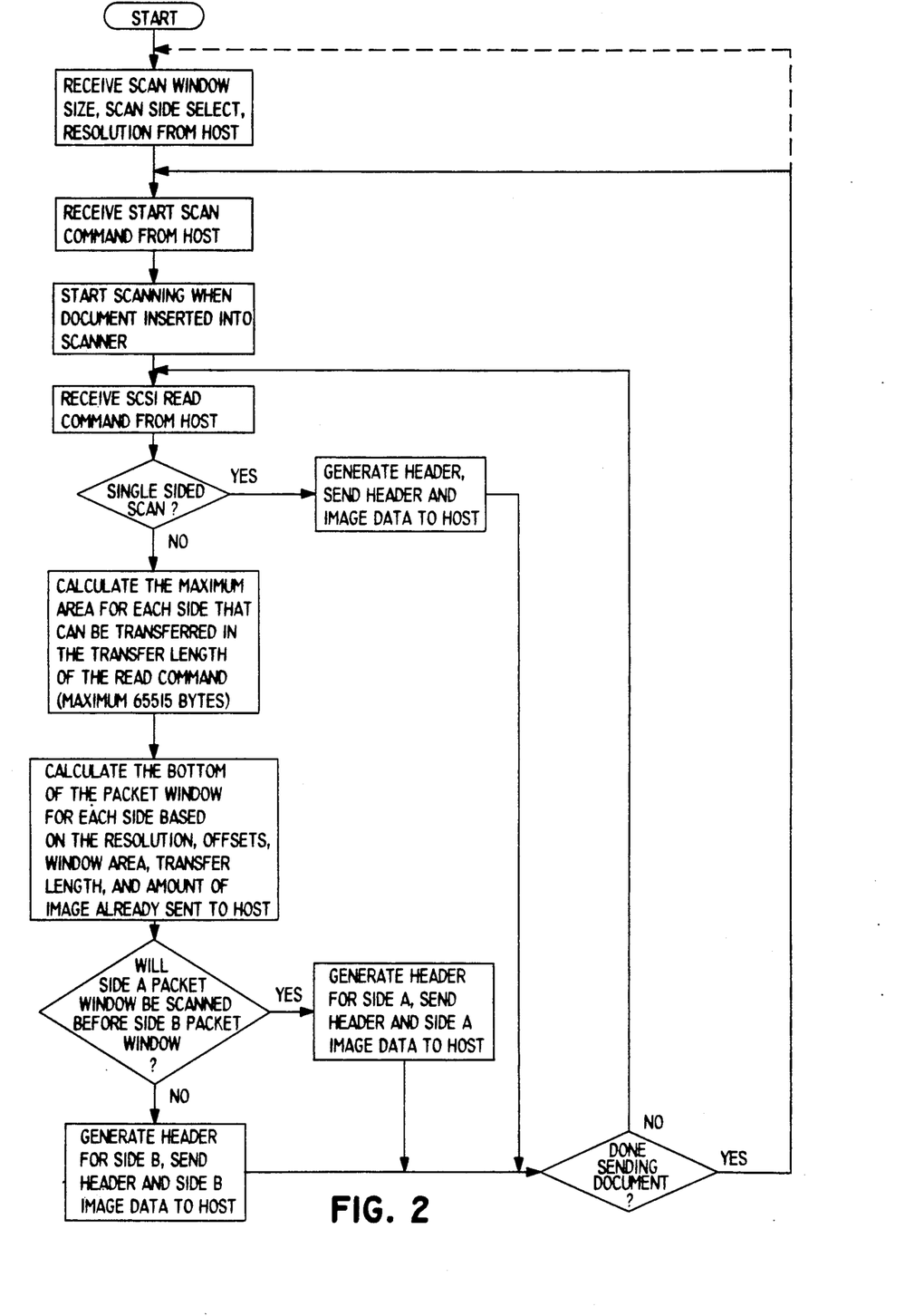
FIG. 2 is a flow chart illustrating the method of the present invention.

The operation of the scanner is best shown in FIG. 2. At the start, the scan window, resolution, and side selection are determined and set up by the host computer before each scan has begun. Once the original document is placed in the scanner, the hardware will begin the scanning operation. The host computer issues a read command to the scanner (via the SCSI) to transfer the image data to the host. The CPU analyzes the transfer length of the read command in order to determine how much image data can be sent to the host for each side. This constitutes the limitation on transfer which the system must accommodate. In those instances in which a single sided original only is being scanned, the amount of data must still be calculated, even though no side selection is necessary.

The size of the packet window is determined based upon the limitations on transfer to which the device is subject. When this has been determined, the bottom of the packet window is calculated for each side. If the bottom of the packet window for side A will be scanned into the image RAM first, then the firmware waits for the packet window for side A to be scanned into the image RAM. If the bottom of the packet window has already been scanned into the image RAM, the data is immediately transferred to the host computer by the SCSI.

On the other hand, if the bottom of side B would be scanned into the image RAM first, then the completion of this packet window is awaited and the data is transferred to the host computer.

Should both packet windows have bottoms which would be scanned into the image RAM at the same time (i.e. they are at the same distance in the scanning direction from the scanner head), then the packet window for side A is transferred to the host computer first. The foregoing process is continued until the last packet window has been reached or an error occurs.

Figure 3A:
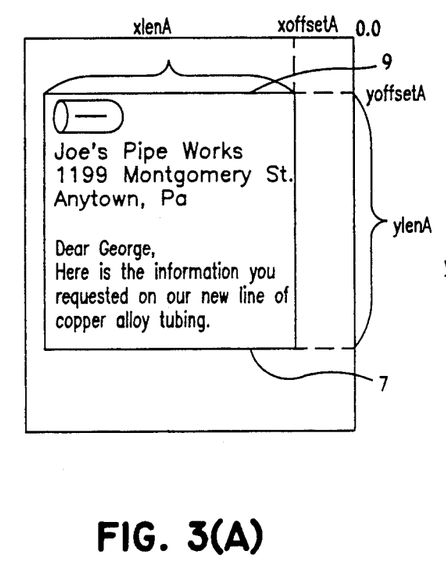
FIGS. 3(A) to 3(Z) indicate the selection which would be made under various circumstances.
Figure 3B:
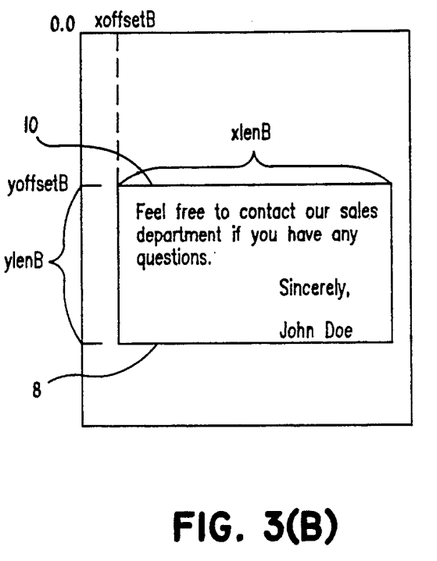
Figure 3C:
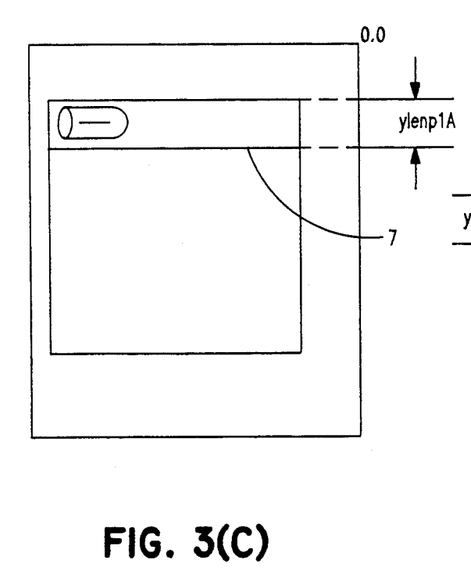
Figure 3D:
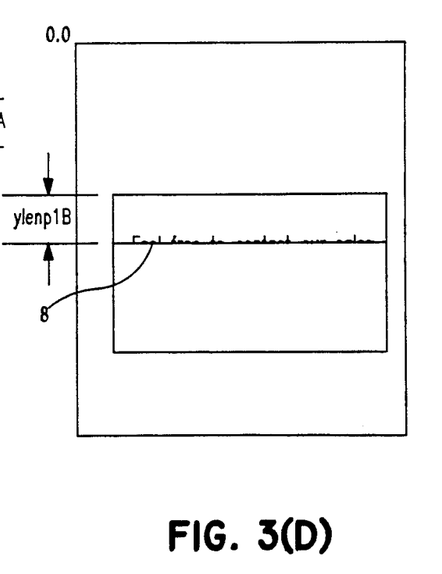
Figure 3E:
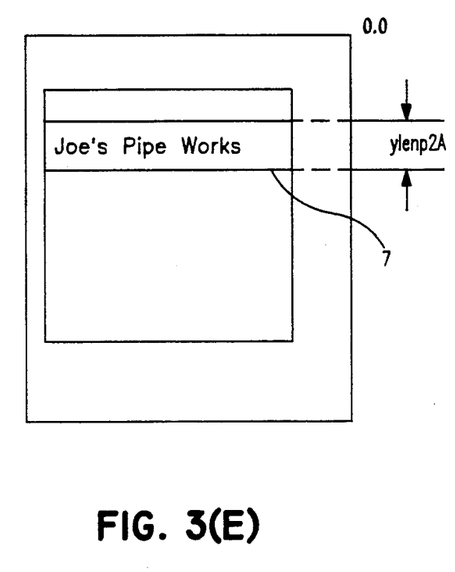
Figure 3F:
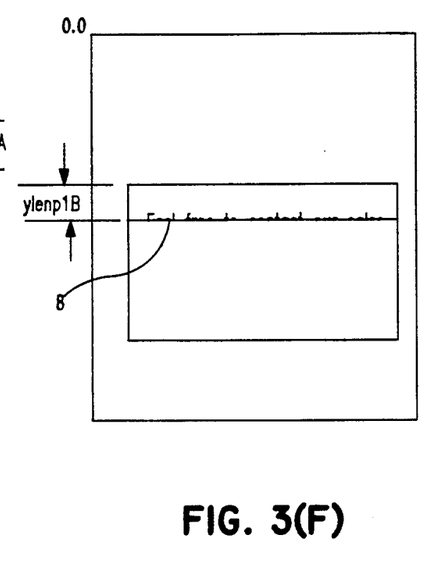
Figure 3G:
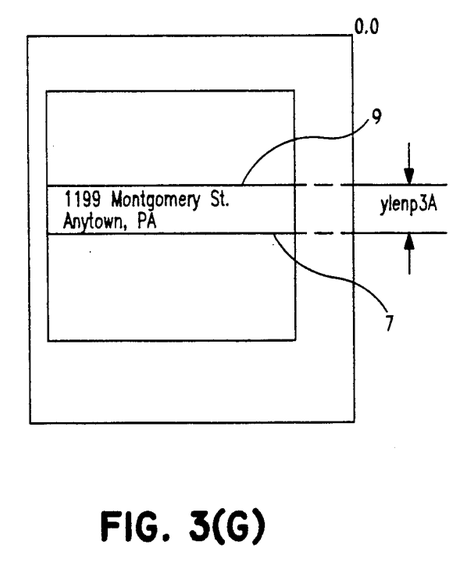
Figure 3H:
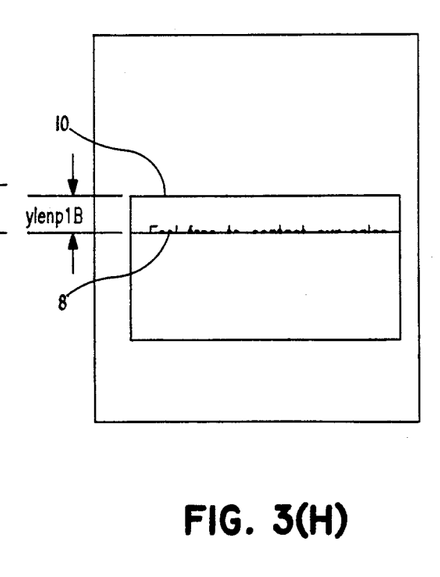
Figure 3I:
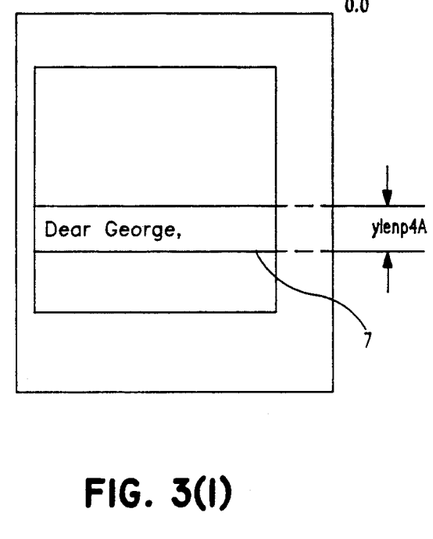
Figure 3J:
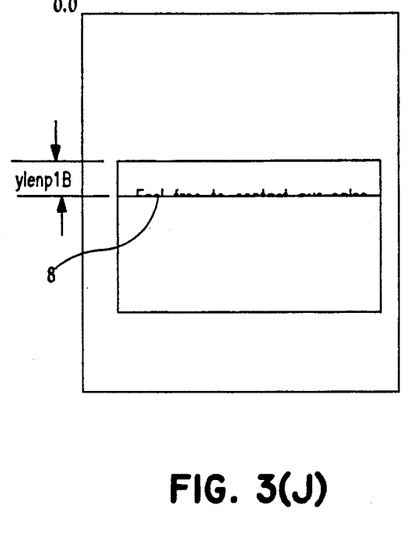
Figure 3K:
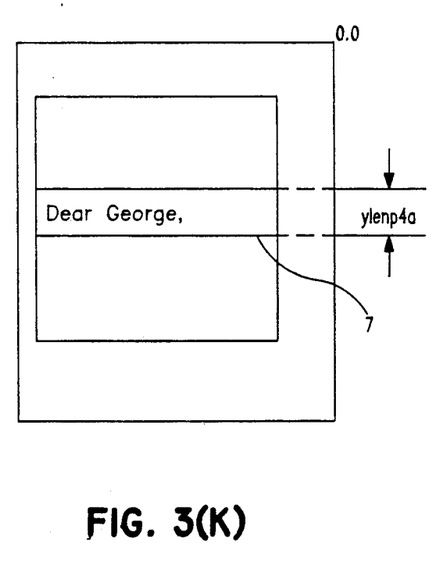
Figure 3L:
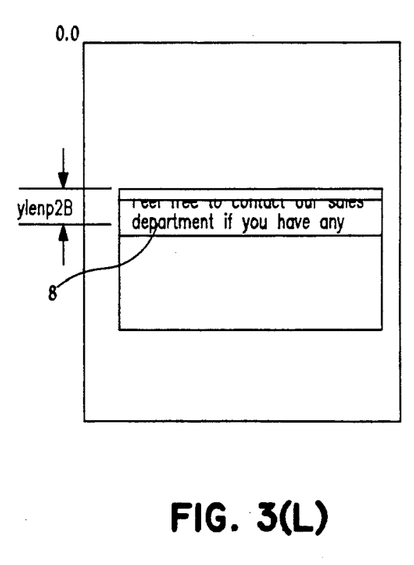
Figure 3M:
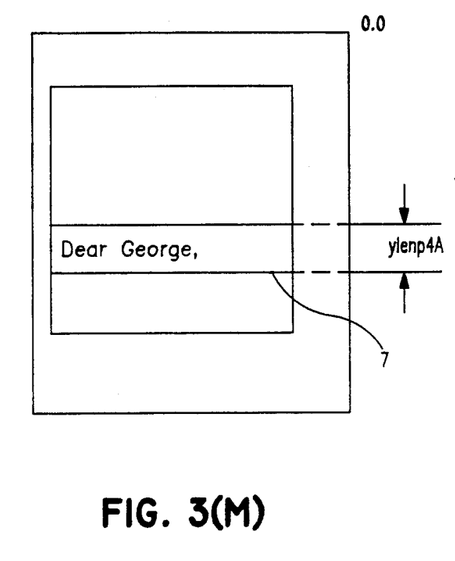
Figure 3N:
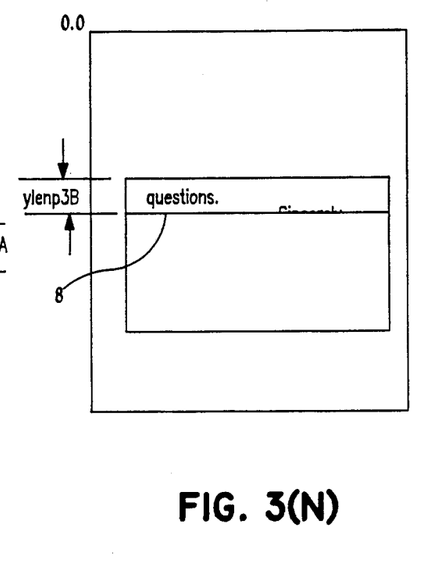
Figure 3O:
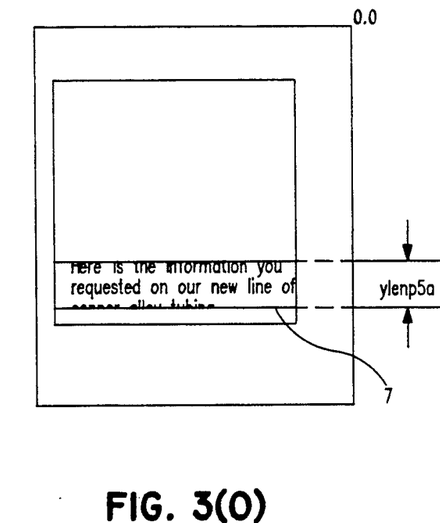
Figure 3P:
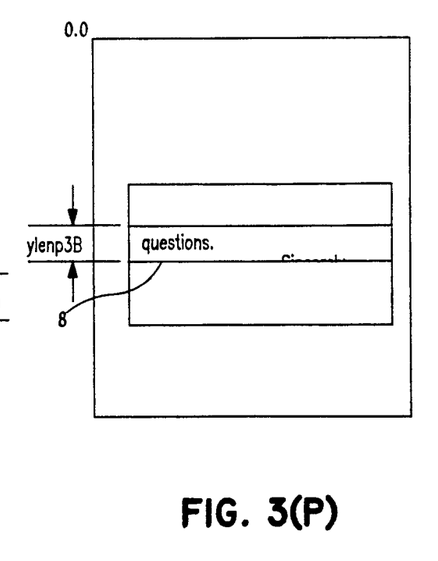
Figure 3Q:
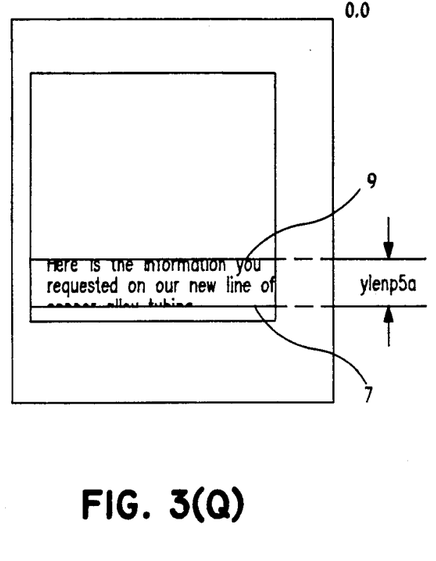
Figure 3R:
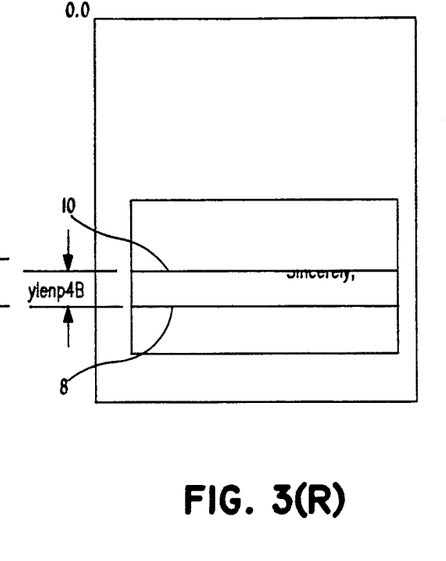
Figure 3S:
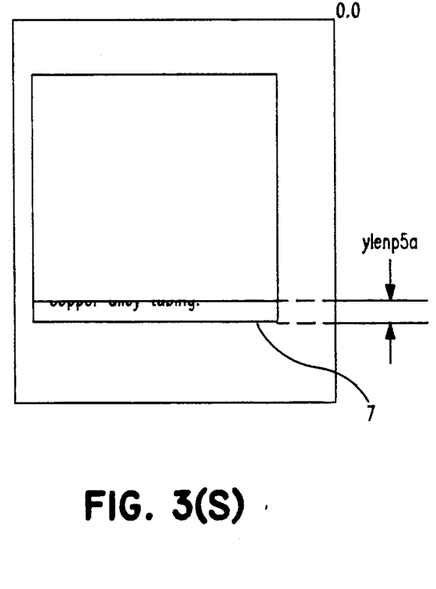
Figure 3T:
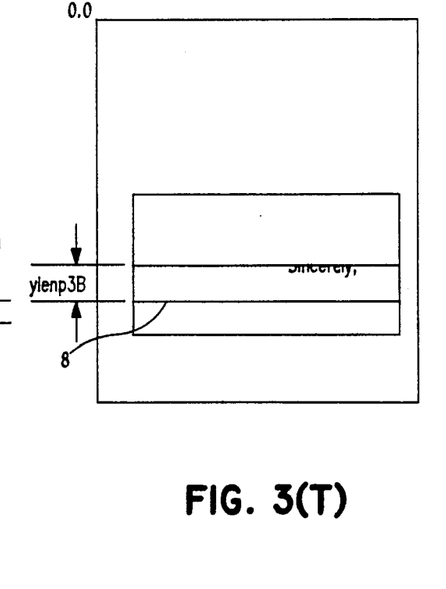
Figure 3U:
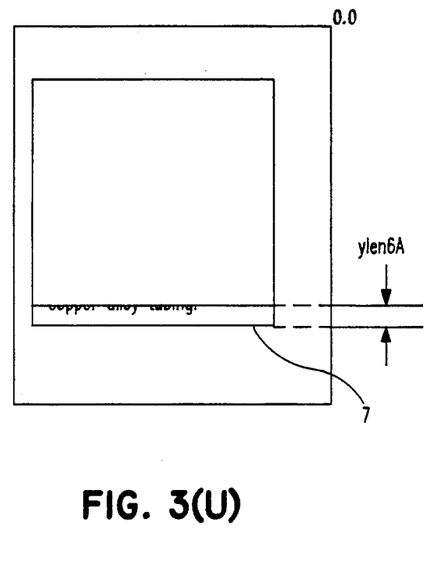
Figure 3V:
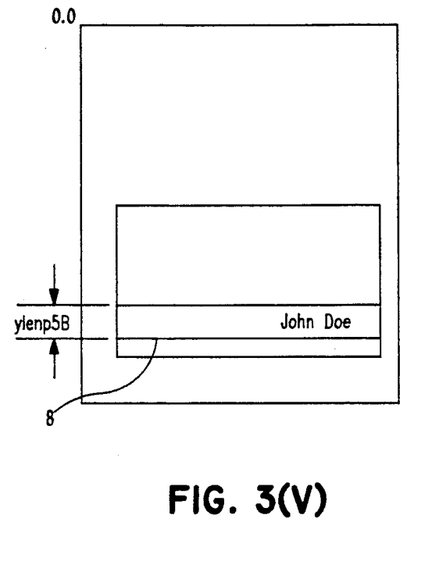
Figure 3W:
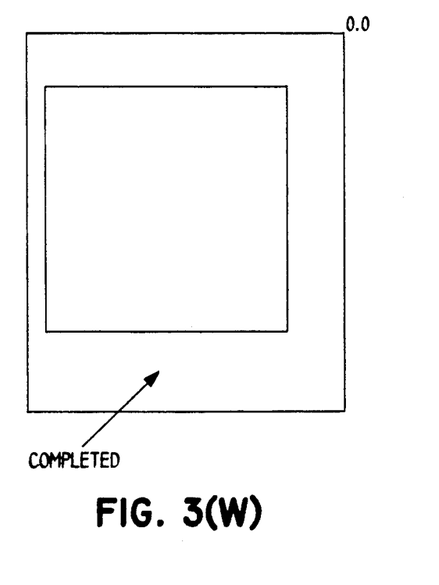
Figure 3X:
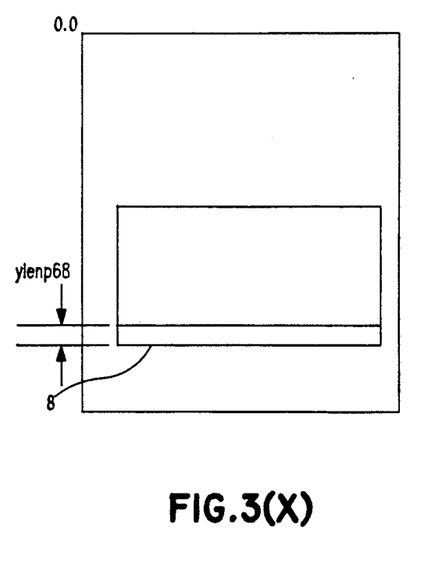

More specific examples of the selection of the various packet windows are shown in FIGS. 3(A) to 3(X). FIGS. 3(A) and 3(B) show the entire window areas which have been selected by the host computer for scanning. This is advantageously done, as previously indicated, prior to starting the scan. It can be seen from these Figures that the origination point on side A is at the upper right corner and the corresponding point on side B is at the upper left corner; both are shown by the 0,0 mark. The designators yoffsetA and xoffsetA show the starting offset of the window area to be scanned for side A of the document. The designators xlenA and ylenA show the width and height of the window area for side A. Corresponding designations indicate corresponding parameters for side B. All of these dimensions are calculated from the two origin points 0,0.

FIGS. 3(C) and 3(D) show the situation in which the first read command has been received from the host computer. As can be seen from these Figures, bottom 7 of side A will be reached by the scanner head before bottom 8 of side B. Therefore, the side A packet window is sent to the host.

When the next read command is received, the situation is as shown in FIGS. 3(E) and 3(F). Here, too, bottom 7 of the second packet window on side A is closer to the scanning head than bottom 8 of the packet window on side B. Therefore, it will be reached first and this data will be sent to the host computer.

In FIGS. 3(G) and 3(H), it will be noted that bottom 7 of the window on side A and bottom 8 of the window on side B are at the same point. Therefore, they would finish scanning at the same time; here, scanning of the side A window will begin first. In this situation, the data from the packet window for side A is sent to the host computer first.

The fourth read command is shown in FIGS. 3(I) and 3(J). At this point, bottom 7 of the side A window is below bottom 8 of the side B window. Thus, the packet window of side B will be scanned first. Therefore, this data, which constitutes the first packet window from side B, will now be sent to the host computer. The fifth read command, as shown in FIGS. 3(K) and 3(L), presents the same situation as the previous command. Bottom 8 is scanned before bottom 7; hence, the side B window will be sent to the host computer.

FIGS. 3(M) to 3(V) are similar to the Figures already specifically discussed. In each case, the window having the first bottom to be scanned is sent to the host; where the bottoms are equal, data from side A is sent to the host computer first.

Figure 3Y:
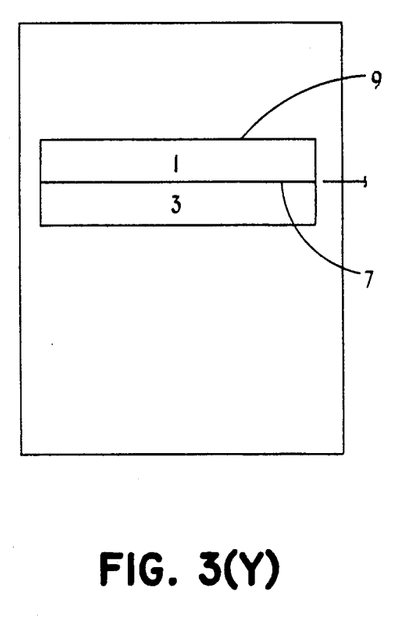
Figure 3Z:
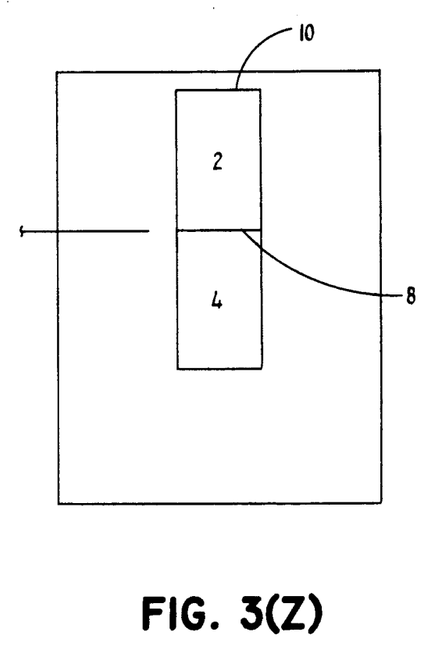

A further illustration is found in FIGS. 3(Y) and (Z). Both bottoms 7 and 8 are at the same location with respect to the scanning movement, but top 10 of side B is closer than top 9 of side A. In this situation, side A is transferred first.

It should be noted that FIG. 3(U) shows the last packet window for side A being sent to the host. FIG. 3(X) show the last packet window for side B being sent to the host computer. This is also the last packet window for the entire document. The packet determination method of the present invention need not be used in this instance, since only side B data remains to be transmitted.

While only a limited number of specific embodiments of the present invention have been expressly disclosed, it is, nonetheless, to be broadly construed, and not to be limited except by the character of the claims appended hereto.

What we claim is:

1. An apparatus for scanning both sides of a document simultaneously and transferring image data resulting from said scanning to a host computer wherein there are limitations on the amount of said image data which can be transferred at one time, said apparatus comprising
    a scanner, connected to said host computer, for scanning both sides of said document simultaneously,
        an image RAM adapted to receive said image data from said scanner and of sufficient size to hold said image data from said both sides,
    an image RAM controller which keeps a running total of said image data and is connected to a CPU, said image RAM, and said host computer, said CPU adapted to receive said running total from said RAM controller and said limitations from said host computer during said scanning, and further adapted to transmit said limitations to said scanner,
    said scanner adapted to determine the location of a first bottom of a first packet window on a first of said sides with respect to a current position of a scanner head in said scanning direction, said scanner adapted to determine the location of a second bottom of a second packet window on a second of said sides with respect to said current position, said first packet window and said second packet window each conforming to said limitations,
    said scanner adapted to transfer data to said host computer based on the one of the first packet window and the second packet window having its bottom nearer said current position in a scanning direction.

2. The apparatus of claim 1 wherein said scanner, when said first bottom and said second bottom are equidistant from said current position, is adapted to transfer data from said first side to said host computer.

3. The apparatus of claim 1 wherein limitation data is transferred from said host computer to said scanner prior to beginning said scanning.

4. The apparatus of claim 3 wherein said limitation data comprises scan window size, document size, resolution, bytes per image line, total bytes of image data in the packet, scan side select, image compression, and/or an indication of the last packet in the images.

5. The apparatus of claim 1 wherein lengths and widths of said first packet window and said second packet window are evenly divisible by 1 mm.

6. A method of scanning a document wherein there are limitations on the amount of image data which can be transferred at one time, said method comprising scanning both sides of said document simultaneously in a scanning direction, transferring said image data resulting from said scanning to an image memory bank adapted to hold said image data from said both sides, maintaining a running total of said image data, reading said running total during said scanning, and comparing said limitations with said running total to determine a size of a packet window conforming to said limitations, determining the location of a first bottom of a first packet window on a first of said sides with respect to a current position of a scanning head in said scanning direction, determining the location of a second bottom of a second packet window on a second of said sides with respect to said current position in said scanning direction, said first packet window and said second packet window not exceeding said size, and transferring said image data to a host computer from the one of said first packet window said second packet window having its bottom nearer said current position in said scanning direction.

7. The method of claim 6 wherein, when said first bottom and said second bottom are equidistant from said current position, data is transferred from said first side to said host computer.

8. The method of claim 6 comprising transferring limitation data from said host computer to a scanner prior to beginning said scanning.

9. The method of claim 8 wherein said limitation data comprises scan window size, resolution, and/or scan side select.

10. The method of claim 6 wherein lengths and widths of said first packet window and said second packet window are evenly divisible by 1 mm.

* * * * *